United States Patent [19]

Ackermann et al.

[11] Patent Number: 4,478,102
[45] Date of Patent: Oct. 23, 1984

[54] TILT DRIVE FOR METALLURGICAL VESSELS

[75] Inventors: Wilhelm Ackermann, Essen; Karlheinz Langlitz, Mulheim, both of Fed. Rep. of Germany

[73] Assignee: Mannesmann Aktiengesellschaft, Dusseldorf, Fed. Rep. of Germany

[21] Appl. No.: 359,741

[22] Filed: Mar. 19, 1982

[30] Foreign Application Priority Data

Apr. 18, 1981 [DE] Fed. Rep. of Germany ....... 3115821

[51] Int. Cl.$^3$ .................... F16H 57/00; F16H 55/18; F16H 37/06; C21C 5/50
[52] U.S. Cl. ...................................... 74/410; 266/245; 266/248; 74/409; 74/661; 74/665 B; 74/720.5
[58] Field of Search ................. 74/661, 665 A, 665 B, 74/665 C, 665 D, 665 E, 410, 720.5, 409; 266/245, 248

[56] References Cited

U.S. PATENT DOCUMENTS

| | | | |
|---|---|---|---|
| 2,404,865 | 7/1946 | Semar | 74/410 |
| 3,238,803 | 3/1966 | Durand | 74/409 |
| 3,292,460 | 12/1966 | Fritsch | 74/410 |
| 3,327,549 | 6/1967 | Riegler et al. | 74/410 |
| 3,390,585 | 7/1968 | Henne | 74/661 |
| 3,459,068 | 8/1969 | Mahringer et al. | 74/410 |
| 3,548,678 | 12/1970 | Phillips | 74/410 |
| 3,576,106 | 4/1971 | Nowicki | 74/661 |
| 3,620,336 | 11/1971 | Clements | 74/410 |
| 3,707,212 | 12/1972 | Durand | 74/410 |
| 3,760,654 | 9/1973 | Fisher | 74/665 E |
| 3,771,777 | 11/1973 | Fisher et al. | 266/245 |
| 3,897,696 | 8/1975 | Schroder et al. | 74/665 B |
| 4,121,481 | 10/1978 | Riegler et al. | 74/410 |
| 4,215,852 | 8/1980 | Ackermann et al. | 266/245 |
| 4,224,836 | 9/1980 | Riegler et al. | 266/245 |

FOREIGN PATENT DOCUMENTS

| | | | |
|---|---|---|---|
| 861660 | 1/1971 | Canada | 74/661 |
| 1650858 | 12/1970 | Fed. Rep. of Germany . | |
| 2104705 | 8/1972 | Fed. Rep. of Germany . | |
| 2554912 | 6/1976 | Fed. Rep. of Germany . | |
| 2654907 | 6/1977 | Fed. Rep. of Germany . | |
| 2658885 | 5/1978 | Fed. Rep. of Germany . | |
| 1368425 | 9/1974 | United Kingdom | 74/409 |
| 612084 | 6/1978 | U.S.S.R. | 74/665 B |

*Primary Examiner*—Lawrence J. Staab
*Assistant Examiner*—M. Bednarek
*Attorney, Agent, or Firm*—Mandeville & Schweitzer

[57] ABSTRACT

A tilt drive is provided for a metallurgical vessel which is mounted on a large sprocket wheel driven by two or more reduction gears. The reduction gears are joined by a torque equalizing apparatus which transmits torque from the pinion of one gear to the pinion of the other, thus acting as a forced synchronizer. The torque equalizing apparatus is effective in both the dynamic and static operations of the drive.

4 Claims, 4 Drawing Figures

TILT DRIVE FOR METALLURGICAL VESSELS

BACKGROUND OF THE INVENTION

The invention relates to a tilt drive for metallurgical vessels, particularly useful as a steel-mill converter tilt drive, with its large sprocket wheel arranged, within a casing, non-rotatively on the rocker pin supporting the casing, with reduction gears arranged by the large sprocket wheel, said reduction gears dragging at a torsion around the secondary shaft, and with the non-rotative pinions on the secondary shafts of said reduction gears always meshing with the large sprocket wheel as well as with brakes which may be switched on and off.

Such drives have been designed for several years as gears riding on the converter rocker pin (also designated as so-called flying drives). The essential characteristic of this type tilt drive is the transmission of the drive force from one or a plurality of stationary electric motors onto two or more pinions meshing to the large sprocket wheel. The division of the drive force into several partial drive forces leads to control problems of the electric motors because the driven pinions must each transmit their partial drive force synchronously with the large sprocket wheel.

The transmission of partial drive forces occurs during the dynamic as well as during the static operation of the drive. The static drive signifies the support of forces caused by the unbalancing and vibration during a tilt position of the vessel which does not vary over time, in which position the brakes of the tilt drive are switched on.

The dynamic as well as the static operation of the tilt drive also leads to uncontrollable motions behind the brakes during the drive flow. These motions are mainly caused by the manufacturing tolerances of the large sprocket wheel and the pinions as well as of the connected reduction gears, couplings and similar elements. Also, particularly in the dynamic operation, with the brakes switched off, the play between the teeth of the sprocket wheels and couplings, including those in the reduction gears, adds to the motions.

Vibrations in the static operation result during the oxidation period from the reactions in the metal bath. These vibrations are transmitted to the brick lining and wall structure of the converter vessel. In the event that the converter vessel is supported on a bearing ring which is arranged by means of the rocker pin in a tilt frame, the vibrations are transmitted by the support elements between the converter wall structure and bearing ring and by the bearing ring to the rocker pin and, finally, to the rocker pin/large sprocket wheel combination and to the pinions which transmit the drive force to the rocker pin/large sprocket wheel combination. The vibrations cause damage particularly at the point where the teeth of the large sprocket wheel mesh with the pinion (DE-AS No. 26 58 885).

As indicated in the literature on static operation, pitching motions up to ($\pm$) 50 mm occur at the crucible apertures.

In the dynamic operation, vibrations occur which are caused by the play of teeth at the large sprocket wheel at the pinion, and the play of teeth between the sprocket wheels of the reduction gear. A synchronous drive of the pinions is indeed aimed for; however, a drive of this type is realizable only with great difficulty, if at all. The reason lies in the respective different angles of rotation of the electric motors per time unit. Regulating all the individual electric motors is not feasible because the technical expenditure required does not justify the result. In order to achieve a synchronous run of the pinions, the electric motor would have to produce a uniform torque.

Controlling the individual electric motors as a function of the angular positions of the respective pinions of the other individual drives is also expensive and enlarges the proportion of electric equipment of a tilt drive for metallurgical vessels.

Controlling the individual electric motors as a function of one or several other electric motors is complicated and expensive, and an appropriate adaptation of the torques of the two pinions may only be approximated.

The object of the present invention is to protect the tilt drive for metallurgical vessels in the dynamic operation by mechanical means from its own vibrations, and further to design the drive mechanism such that it may also be protected in static operation from outside vibrations.

SUMMARY OF THE INVENTION

The object is achieved, based on the initially characterized tilt drive, by providing a torque equalizing apparatus which connects the two shafts at a distance, adjusted or adjustable to a co-efficient, between each respective shaft of at least two reduction gears forming a differential gear. This torque equalizer transmits excess torque from the shaft with the higher torque to the shaft with the lower torque. The torque equalizer thereby prevents the pinion first in pivoting angle from leading or dragging in relation to the second pinion. The torque equalizer, accordingly, works as a forced synchronizer. During the run, the torque equalizer apparatus of the present invention thereby causes overlapping angle adjustments of the individual rotating shafts.

The torque equalizer apparatus may be realized in various embodiments. One preferred embodiment is to have the shaft butts, which project from each reduction-gear casing, of at least two reduction gears connected with non-rotatable levers, their lever ends being connected with a tension-compression member. The tension-compression member receives, in various directions, the forces resulting from the torques.

In a further development of the invention, the tension-compression member comprises a rod chargeable with tension and compression forces. Each rod is hinged to the lever ends of each respective rod end.

It is proposed in a further development of the present invention that the torque-equalizer apparatus be combined with a locking gear for the pinions with respect to the large sprocket wheel. The tilt drive, according to the invention, is thereby capable of catching its own and outside vibrations without the risk of breakage at the tooth structures.

In a further development of the torque-equalizer apparatus of the present invention for the static operation of the tilt drive, the tension-compression member is extended by the effective distance of the levers, connected with each other and to a straight sliding gear, of which the element absorbing the torque is stationary. In activating the straight sliding gear, the lever is caused to pivot up to the point where the individual pinion contacts the tooth structure of the large sprocket, thereby switching on the brakes, in the static operation.

The electromagnetic sliding gear, which is hydraulically or pneumatically operated, is arranged such that the stationary element which absorbs the torque is fastened to the large sprocket wheel casing or to a reduction-gear casing.

A further improvement of the synchronization of the pinions may also be achieved in an embodiment of the present invention by driving the reduction gears, which are rigidly connected by means of the torque-equalizer apparatus through its shafts, by one or a plurality of electric motors, whose drive shafts are coupled with each other. The result of the coupling of the individual electric motors is to make the power chain which is to be synchronized in one gear pull as short as possible. By coupling the individual electric motors, the synchronization track is limited to the gear pull of the reduction gear.

The connection of the individual electric motors may also be created by connecting them with each other by way of a continuous drive strand.

For a more complete understanding of the novel apparatus of the present invention, several exemplary embodiments are illustrated in the drawing and described in more detail below.

DETAILED DESCRIPTION OF A PREFERRED EMBODIMENT OF THE INVENTION

Figure 1:
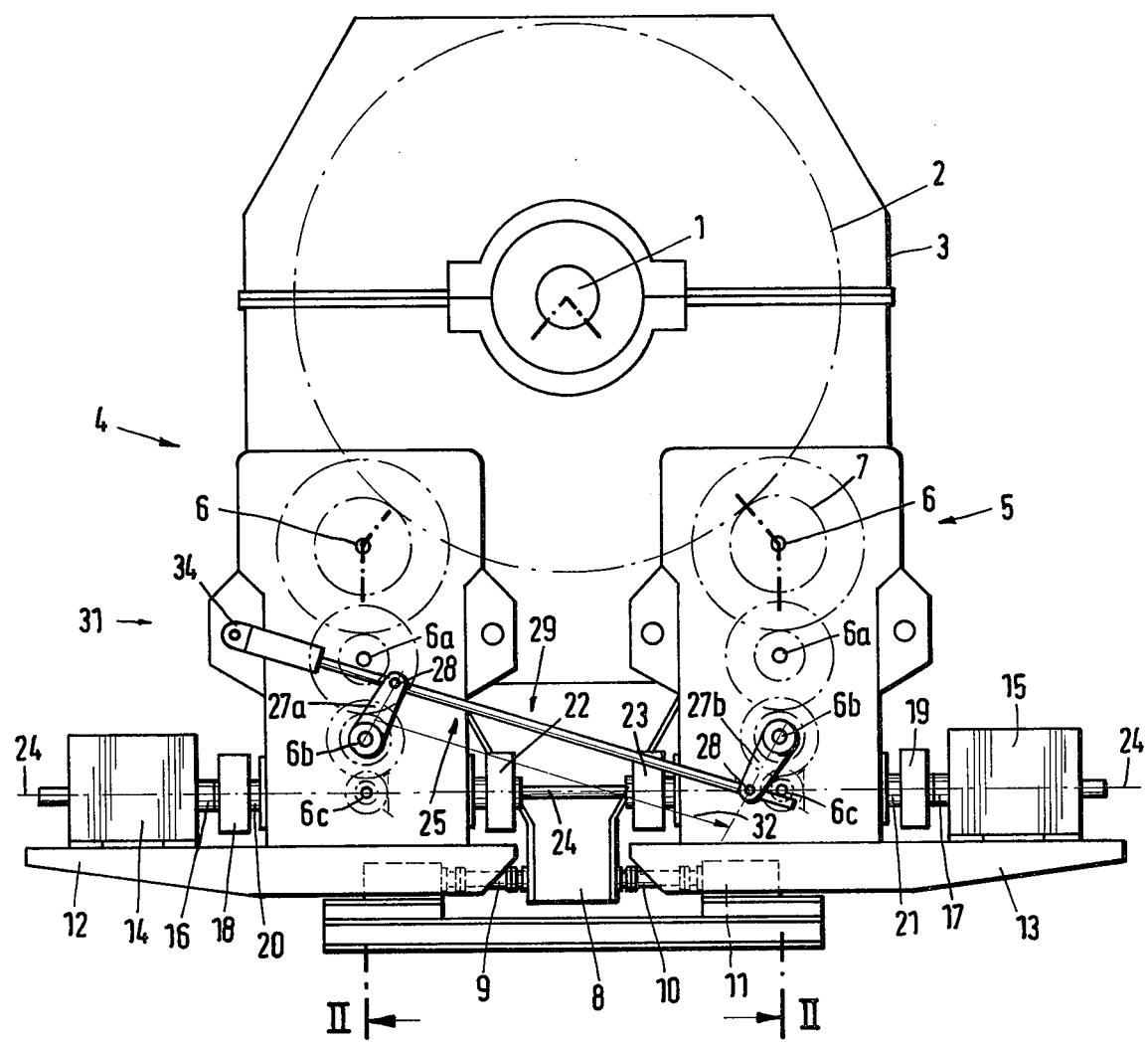
FIG. 1 is a front elevational view of the tilt drive of the present invention, for a steel-mill converter as an example for a metallurgical vessel.
Figure 2:
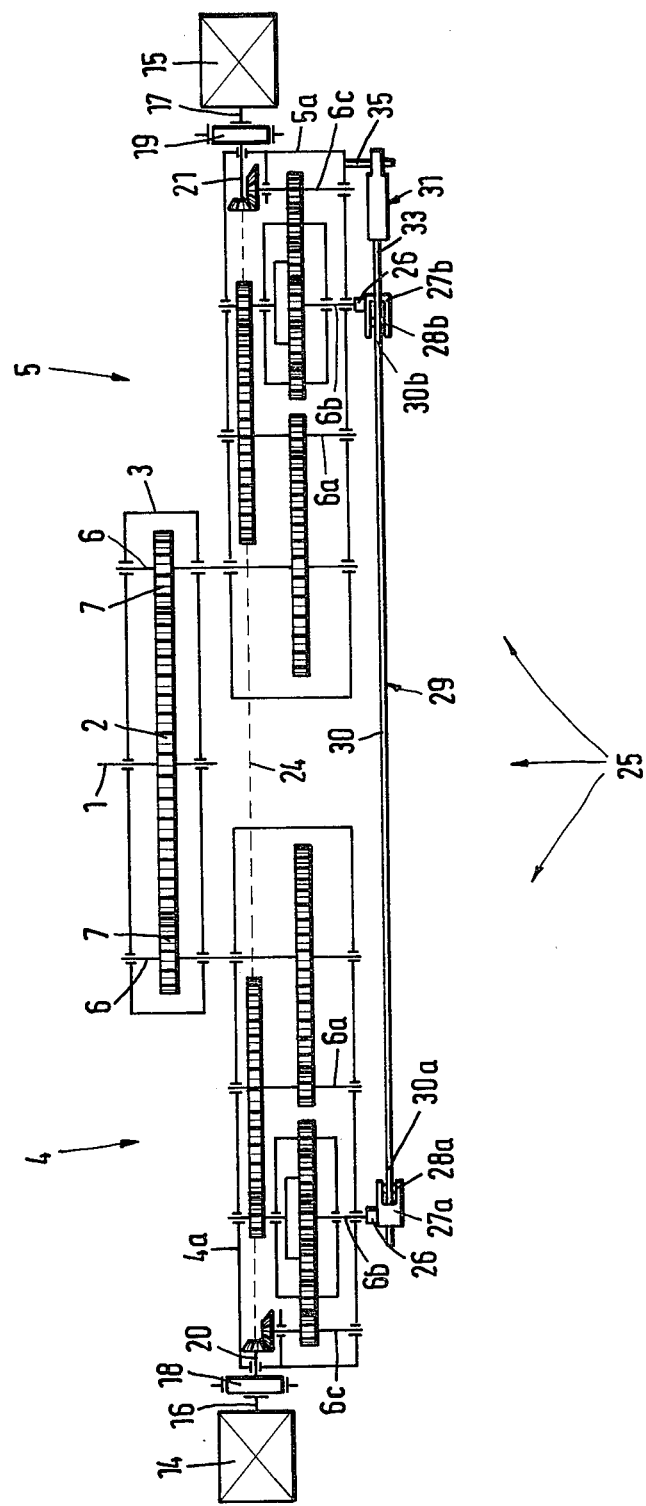
FIG. 2 is a sectional view along 2—2 as indicated schematically in FIG. 1, in which the reduction gear is illustrated as shifted into the drawing plane.

In FIG. 1, a metallurgical vessel, not illustrated in detail, is supported by means of two rocker pins 1 (only one of which visible) and tilted by means of the tilt drive, as illustrated in FIGS. 1 to 4, into the tilting position between 0° and 360° necessary for the operation.

The tilt drive has a large sprocket wheel 2 which is arranged non-rotatably, within the casing 3, on the rocker pin 1. The reduction gears 4 and 5 are arranged in association with the large sprocket wheel 2. Each of the reduction gears 4, 5, both of which have the same general construction, has a secondary shaft 6, with a pinion 7 which meshes with the large sprocket wheel 2. This pinion 7 is arranged non-rotatably on said secondary shaft 6. Furthermore, each of the reduction gears 4, 5 is fastened at the casing 3 or prevented by a torque support (not illustrated) from rotating around the axis of the secondary shaft 6. Casing 3 is also arranged, flexibly or not, by means of a torque support 8, between the stationary ball-shaped bracket claws 9 and 10 so that the rocker pin 1 may execute, on pre-stressed springs 11 and unimpeded within limits, vertical motions as well as thrust motions and skewed positions, vertical to the drawing plane, in which no load shocks whatever occur at the torque support 8 while reversing rotating direction.

The reduction gears 4, 5 support brackets 12, 13, on which rest the electric motors 14, 15 (direct current or alternating current drives). These motors form one single drive line 24, by way of the motor shafts 16, 17, brakes 18, 19, drive shafts 20, 21, and couplings 22, 23.

The reduction gears 4, 5, in addition to the secondary shaft 6, each have further shafts 6a, 6b, 6c according to the number of existing reduction stages. The reduction gears 4, 5 are connected with each other not only by the drive shafts 20, 21, but also by the novel torque-equalizer apparatus 25 of the present invention.

The torque-equalizer apparatus 25 may, as illustrated, be used between equal stages of the reduction gears forming a differential gear, i.e., between the shafts 6b/6b. Levers 27a, 27b are non-rotatably arranged on the shaft butts 26. At their lever ends 28, a tension-compression member 29, consisting of a rod 30 which is resistant to tensile forces and to buckling under compression, is articulated from its rod ends 30a, 30b. As soon as the torque, transmitted by the individual electric motors 14, 15, is preponderant at the shaft butts 26 on the side of one of the reduction gears 4, 5, the excess share is transmitted to the respective other shaft butt 26, thereby continuously effecting contact of the teeth in direction of the flow of force from the pinions 7 to the large sprocket wheel 2. This equalization of the torque helps to overcome the damaging self-vibrations in the dynamic operation, thereby preventing damage to the teeth.

For the static operation, a locking gear 31 is connected with the torque-equalizer apparatus 25. To this end, the tension-compression member 29 is extended, by way of the fixed distance 32 measured from one effective lever end 28 to the other effective lever end 28, and the tension rod extension 33 is articulated to an electromagnetic pneumatic, or hydraulic straight-sliding mechanism 34. Element 35 (a stator, cylinder, or similar element), which absorbs the torque, is stationary and fastened at the casing 3 of the large sprocket wheel 2 or at one of the reduction gear casings 4a, 5a.

When it is desired to hold the converter vessel in a desired orientation, i.e., after tilting is complete, the operation of the straight-sliding gear 34 (in the form of a piston-cylinder) comes into operation. The tension-compression member 29 can laterally shift and the straight sliding gear will absorb the vibrational forces of the vessel, due to oxidation blasting, by the rod extension 33 being contained within a cylinder, held to the casing, thereby reducing the vibrations on the gear teeth after the mechanism has first overcome the "play" between the teeth of the pinions and the large sprocket wheel 2.

In addition, the brakes 18, 19 are then switched on, i.e., after the pivoting of the vessel is complete and when it is desired to hold the vessel at a standstill, which, too, reduces the play of teeth between the pinions 7 and large sprocket wheel 2. It cannot be overemphasized that the vessel is subject to overwise damaging vibrations, even while the vessel is at rest and it is these "at rest" vibrations which are reduced by the present straight-sliding gear.

For a hydraulic effect, the tension-compression member 29 may also consist of two dually chargeable piston-cylinder drives, with their corresponding pressure space connected with each other by means of hydraulic lines.

Figure 3:
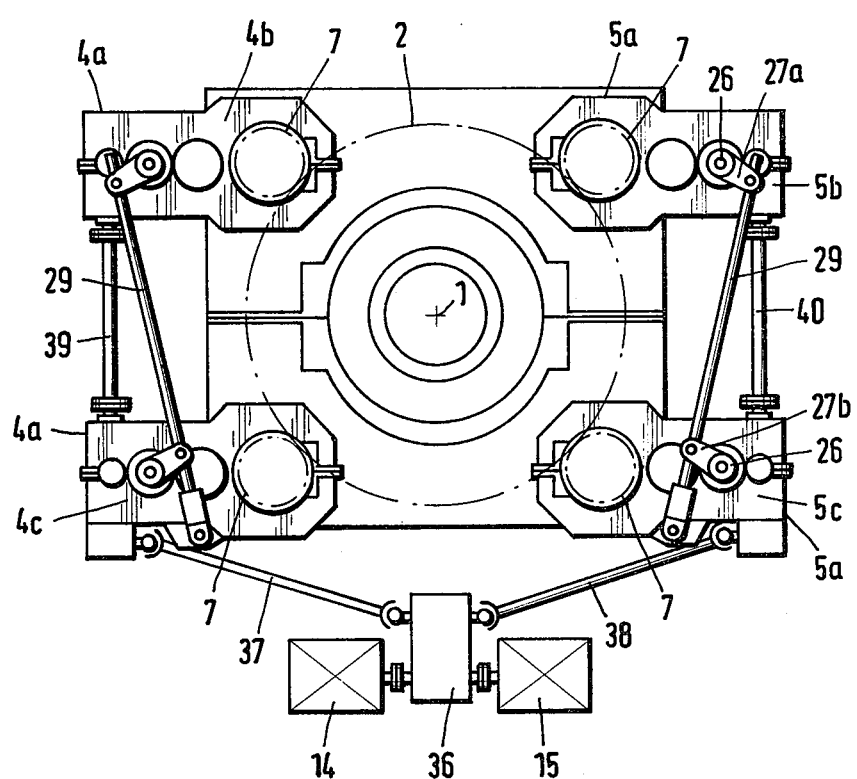
FIG. 3 is a front elevational view of a second exemplary embodiment, of the tilt drive according to the invention.
Figure 4:
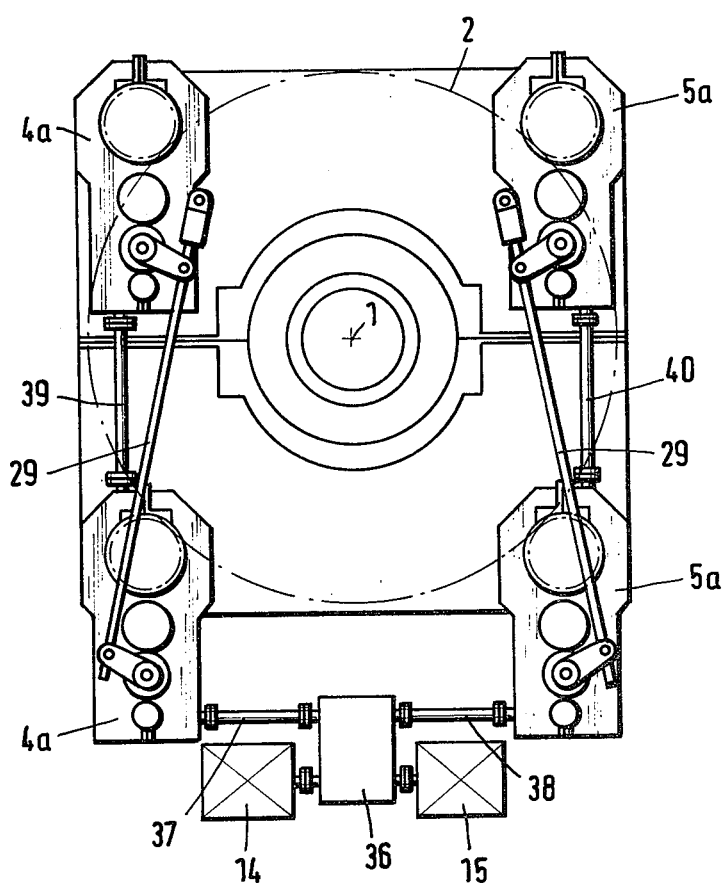
FIG. 4 is a front elevational view of a third exemplary embodiment of the tilt drive according to the invention.

In addition, the invention is realizable according to the exemplary embodiments in FIGS. 3 and 4. In the second exemplary embodiment (FIG. 3), the reduction gears 4b, 4c, 5b, 5c are arranged around the large sprocket wheel 2, said gears each meshing, with their pinions 7, with the large sprocket wheel 2. The individual electric motors 14, 15 drive the differential gear 36, which is a simple bevel differential gear. In contrast, the differential gears, which are formed by the reduction gears 4, 5 are formed of planetary gear stages which, in pairs, together result in the differential stage. The torque of the electric motors 14, 15 is transmitted behind the differential gear 36 by the drive shafts 37, 38, 39, 40, to the reduction gears 4b, 5b. The reduction gears 4b, 4c, 5b, 5c, are designed to be the same type as reduction gears 4, 5, of the type illustrated in FIG. 2. The levers 27a, 27b are also articulated at the shaft butts 26. With the reduction-gear casings 4a, 5a extending more horizontally, the tension-compression members 29 extend in a vertically sloping direction, thereby rendering possible an arrangement of teeth of four pinions 7 without play.

A similar extension of the tension-compression members 29 results, according to a third exemplary embodiment (FIG. 4), with reduction gear casings 4a, 5a extending more vertically.

It should be understood, of course, that the specific forms of the invention herein illustrated and described are intended to be representative only, as certain changes may be made therein without departing from the clear teachings of the disclosure. Accordingly, reference should be made to the following claims in determining the full scope of the invention.

We claim:

1. A torque-equalizing and locking mechanism for pinion gears for a tilt drive for a metallurgical vessel, wherein said tilt drive comprises:
   (a) a large sprocket gear, non-rotatively mounted to the rocker pin of a metallurgical vessel, said sprocket gear being housed in a casing;
   (b) at least two pinion gears for rotating said sprocket gear, rocker pin and vessel;
   (c) a separate reduction gear mechanism for driving each of said pinion gears;
   (d) said reduction gear mechanisms comprising at least one reduction gear rotatable about a shaft; and
   (e) a separate drive motor for selectively driving each of said reduction gear mechansims; wherein said torque-equalizing and pinon gear locking mechanism comprises:
   (f) a lever arm having two ends, one end of which is rotatably secured to each of said shafts;
   (g) said lever arms being of adjustable effective length;
   (h) a torque-equalizer bar connecting the other ends of a pair of said lever arms, said bar being pivotable about said other ends of said lever arms;
   (i) said bar serving to transmit and thereby equalize torque between said paired levers connected to the shafts of said reduction gear mechanisms; and
   (j) said bar being further provided with a locking mechanism for pinion gears, comprising a longitudinal extension of said bar as a piston and a cylinder secured to said casing, said piston and cylinder acting as a straight sliding mechanism.

2. A torque equalizing and locking mechanism for pinion gears, as claimed in claim 1, wherein:
   (a) said bar is a tension-compression transmitting member.

3. A torque equalizing and locking mechanism for pinion gears, as claimed in claim 1, wherein:
   (a) said drive motors are provided with drive shafts; and
   (b) said drive shafts are coupled to one another.

4. A torque equalizing and locking mechanism for pinion gears, as claimed in claim 3, wherein:
   (a) said drive shafts lie in a straight line.

* * * * *